(12) United States Patent
Hsieh

(10) Patent No.: US 6,959,226 B2
(45) Date of Patent: Oct. 25, 2005

(54) SYSTEM AND METHOD FOR SPLIT LOT ID NAMING

(75) Inventor: Hui-Jye Hsieh, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 873 days.

(21) Appl. No.: 09/870,566

(22) Filed: May 31, 2001

(65) Prior Publication Data

US 2002/0133259 A1 Sep. 19, 2002

(30) Foreign Application Priority Data

Mar. 16, 2001 (TW) ........................................ 90106218 A

(51) Int. Cl.⁷ .............................................. G06F 19/00
(52) U.S. Cl. ..................... 700/115; 700/116; 700/110; 700/215; 700/219; 700/224; 700/225; 700/226
(58) Field of Search ........................ 700/95, 108, 109, 700/115, 116, 219, 221, 222, 224, 225, 226, 227; 382/306

(56) References Cited

U.S. PATENT DOCUMENTS 5,311,438 A * 5/1994 Sellers et al. ................. 700/96
6,157,866 A * 12/2000 Conboy et al. ............. 700/121
6,208,947 B1 * 3/2001 Beffa .......................... 702/118
6,522,939 B1 * 2/2003 Strauch et al. ............. 700/116
6,609,041 B1 * 8/2003 Sanka et al. ................ 700/115
6,671,569 B1 * 12/2003 Schoop et al. .............. 700/112
2002/0072162 A1 * 6/2002 Dor et al. ................... 438/200

FOREIGN PATENT DOCUMENTS

JP    2003337610 A  *  11/2003   ......... G05B/19/418

* cited by examiner

*Primary Examiner*—Ramesh Patel
(74) *Attorney, Agent, or Firm*—Thomas, Kayden, Horstemeyer & Risley

(57) ABSTRACT

The present invention provides a system and method for creating an exclusive ID to a split lot in a multiple-plant enterprise. When a lot is divided, the split lot is first assigned a main code by a main ID unit. When the split lot is divided in the initial plant, a split ID unit assigns a split code to the split lot according to a sequence. When the split lot is not divided in the initial plant, the split ID unit assigns a plant code and a split code according to a sequence to the split lot. All of the codes of the lot are stored in an ID storage unit for lot administration.

12 Claims, 4 Drawing Sheets

SYSTEM AND METHOD FOR SPLIT LOT ID NAMING

FIELD OF THE INVENTION

The present invention relates to a system and method for split lot ID naming, more particularly, to a system and method for split lot ID naming in manufacturing processes involving multiple plants.

BACKGROUND OF THE INVENTION

Smaller wafer dimensions and the large number of steps required to fabricate state of the art integrated circuits (on semiconductor wafers) require each process step to meet tight specifications. Current semiconductor manufacturing can be divided into: fabrication, circuit probing, assembly and final testing. The process has become sophisticated because the manufacturing technology has progressed rapidly. For semiconductor manufacturers with multiple plants, the manufacturing process may be distributed across multiple sites to achieve optimum capacity control. The materials or semi-finished products may be transferred between different plants to undergo successive processes. The Manufacture Execution System(MES) will encounter some problems when a lot is transferred between plants. For example, a duplicated split lot ID created in different MES systems will only register as a single unit ID in the Enterprise Resource Application(ERP) System. Also, when the lot ID already exists in the imported MES, the transfer function will fail.

The available MES, e.g. PROMIS or IBM Poseidon, generally sets the lot ID. However, when a lot is split and then transferred to another operation plant, there may be a duplicate split lot ID created by the MES of the respective plants. FIG. 1 is a diagram showing lot splitting and ID creating between two plants. With PROMIS, for example, when a lot with lot ID A12345.1 is divided into two lots in Plant A, the first lot keeps the lot ID as A12345.1 and PROMIS in Plant A 12 generates a lot ID A12345.2 for the second lot. When the first lot with lot ID A12345.1 is transferred to Plant B, Plant B accepts A12345.1 to track the first lot in plant B via intranet 16. However, when the first lot with lot ID A12345.1 is divided into two lots in Plant B, the PROMIS in plant B 14 also generates a lot ID A12345.2 for the split third lot. Now, lot ID A12345.2 exists in both plant A and plant B.

In the condition described above, the ERP system cannot identify the second lot and the third lot which are named as the same lot ID A12345.2 by the MES in Plant A and Plant B, respectively. The ERP system can only track one lot, and the management information of the other lot which is named as the same lot ID will fail to register. Additionally, when the split lot with lot ID A12345.2 in Plant A is transferred to Plant B, MES in Plant B will reject the transfer 16 (rejection indicated in the drawing by an "X" through the lower, or second, transfer 16) because the lot ID A12345.2 has already registered in Plant B. The process is stalled.

Another conventional solution to avoid duplicated lot ID is to create an exclusive ID for every lot in each plant by a central control system. However, for semiconductor manufacturers with multiple plants, when the connection between the central control system and the multiple plants is unstable or even disconnected, the lot ID naming will be delayed or suspended. Therefore, the manufacturing follow-up procedures will also stop because of the missing lot ID. The time delay mentioned above for a semiconductor manufacturer can cause major loss. Creating an exclusive ID in the central control system is still not the best solution because of its lack of flexibility.

SUMMARY OF THE INVENTION

The object of the present invention is to provide a system and method for creating exclusive split lot IDs when lots are split and transferred to multiple plants, thus avoiding duplicate lot ID problems.

When an initial lot begins processing from an initial plant in a multiple-plant manufacturing system, the present invention provides a system for split lot ID naming comprising a main ID unit, a split ID unit and an ID storage unit. The main ID unit assigns a main code to a split lot. The split ID unit identifies to which plant or plants the lot has been shipped, and assigns a plant code to the split lot with a split code following the plant code. All of the codes of the lot are stored in the ID storage unit.

According to the present invention, a method for split lot naming in multiple plants first assigns the split lot a main ID code, then identifies to which plants the lot was sent. If the lot is divided in the initial plant, a split code is assigned to the split lot following the main ID code. If the lot has been transferred to another plant and is not divided in the initial plant, then a plant code is assigned to the split lot, as is a split lot code following the plant code. All the codes of the lot are stored.

The invention is described in reference to semiconductor wafer manufacturing, but can be applied to virtually any kind of multiple-site manufacturing system. The process and system described is versatile and can be adapted to a wide range of manufacturing environments.

BRIEF DESCRIPTION OF THE DRAWINGS

The foregoing and further aspects of the invention are illustrated in the accompanying drawings wherein like elements are denoted by like reference designators and in which.

DETAILED DESCRIPTION OF THE PREFERRED EMBODIMENTS

The preferred embodiments describe the system and method for split lot naming for semiconductor processing in multiple plants. As manufacturing begins, the MES of the manufacturing plant creates a unique lot ID for an initial lot to manage the manufacturing progress. The plant where the initial lot begins is defined as the initial plant. When the initial lot is divided into two lots, one lot still keeps the original lot ID created by the MES and the split lot naming system according to the present invention generates an exclusive ID to represent the other lot.

Figure 1:
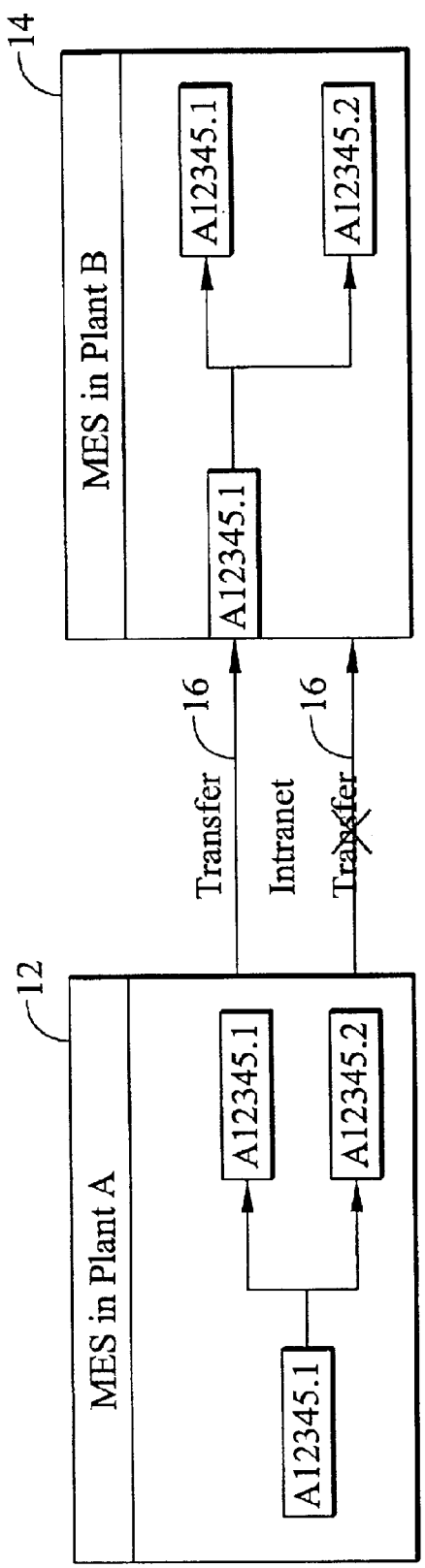
FIG. 1 is a schematic diagram of the conventional naming system for split lots.
Figure 2:
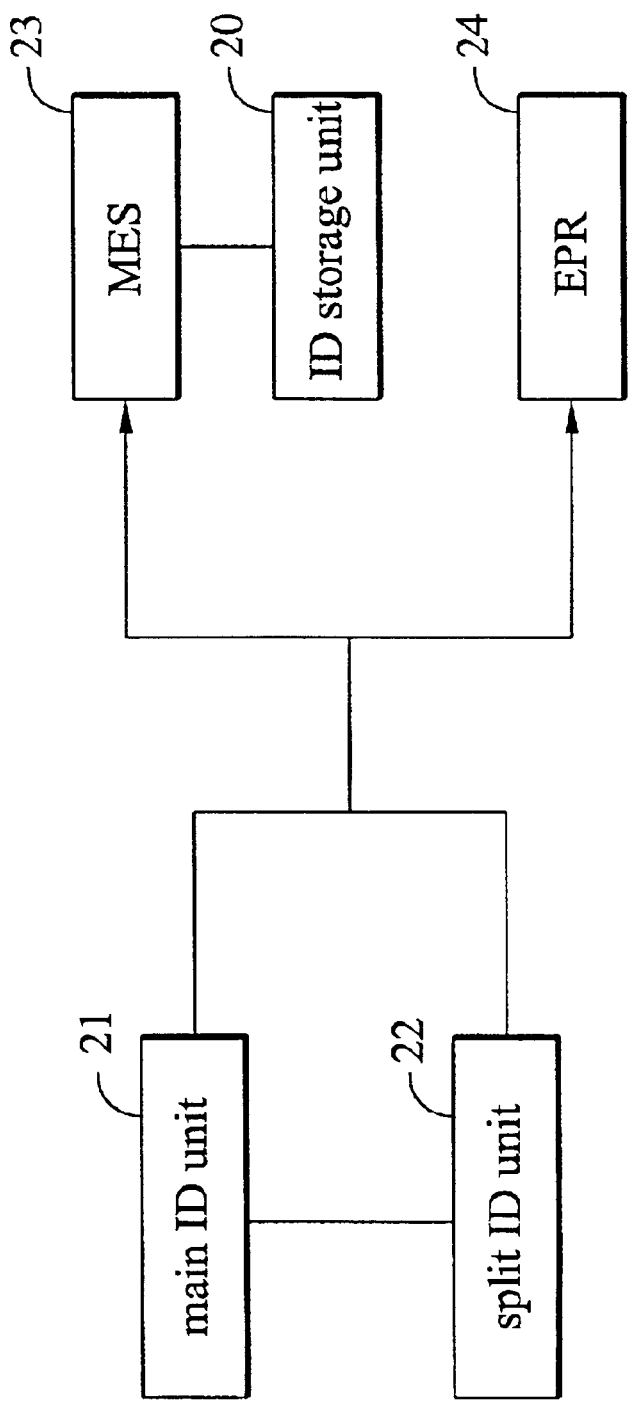
FIG. 2 is a schematic diagram of a split lot naming system in accordance with the preferred embodiment of the present invention.

Referring to FIG. 1, the split lot naming system according to the present invention comprises an ID storage unit 20, a main ID unit 21 and a split ID unit 22. The ID storage unit 20 is designed for storage of all information regarding lot ID. According to one embodiment, the ID storage unit 20 can be onboard storage device of the MES. However, the ID storage unit 20 can also be an external storage device connected to the MES.

Referring again to FIG. 1, the main ID unit 21 is connected to the MES and ERP and assigns a main code to a split lot according to a preset parameters, e.g., serial numbers. The main code of the split lot can be assigned as the original ID of the initial lot to denote from which lot it has been divided.

Referring still to FIG. 1, a split ID unit 22 is connected to the main ID unit 21 and is designed to assign a split code and a plant code to the split lot according to preset parameters. The split ID unit 22 is programmed to recognize if the lot is split in the initial plant. If so, the split ID unit 22 assigns the lot a split code following the lot main code. Split code assignment follows a sequence to denote how many times the initial lot is divided in the same plant. When the lot is transferred to another plant and is not split in the initial plant, the split ID unit 22 assigns the lot a plant code following the main code. The plant code is assigned to represent which plant the lot is divided in. Then, the split ID unit 22 also assigns the lot a split code following the plant code. Split code assignment follows a sequence to denote how many times the initial lot is divided in the same plant.

The main code of the split lot can be assigned as the original ID of the initial lot. For example, when a lot begins from plant F, the MES of plant F generates an ID code "F12345" to the lot. "F" represents Plant F and "12345" is the serial number of the lot. When the lot F12345 is split in Plant F or Plant C, the main ID unit 21 assigns "F12345" as the main code of the split lot to denote that the split lot originated from the initial lot F12345.

In one preferred embodiment, the split lot naming system is connected to the MES 23. The split lot ID assigned by the split lot naming system according to the present invention is stored in the ID storage unit 20 in MES 23. Further, the split lot naming system can also connect to the ERP system 24 (Enterprise Resource Application system) of the manufacture. Both the MES 23 or the ERP system 24 can administrate the lot manufacturing progress with the exclusive split lot ID.

Figure 3:
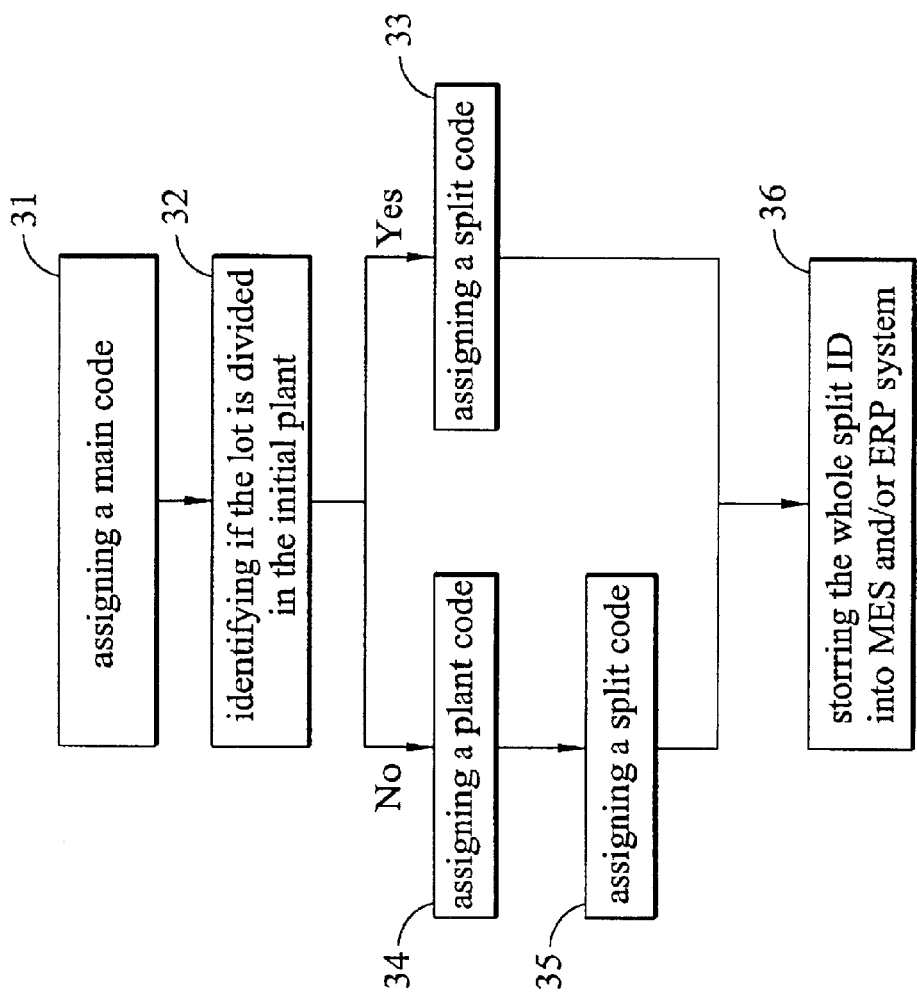
FIG. 3 is a flow chart of a split lot naming method in accordance with the preferred embodiment of the present invention.

Referring to FIG. 3, a split lot naming flow chart of steps performed in accordance with the present invention. As shown in FIG. 3, at step 31, when an initial lot is split, the present invention first assigns the split lot a main code. The main code can be the ID code of the initial lot created by the MES of the initial plant. Next, at step 32, the present invention identifies if the lot is divided in the initial plant. If it is, step 33 commences, but if not, the process jumps to step 34. At step 33, when the lot is divided in the initial plant, a split code is assigned to the split lot following the main code. However, the lot may be transferred to another plant to continue manufacturing and is not in the initial plant. Therefore, when the lot is transferred to another plant and is divided there, a plant code is assigned to the split lot following the main code at step 34 to denote to which plant the lot has been sent. At step 35, a split code is assigned to the split lot following the plant code. Therefore, the ID of the split lot can be named as: "main code+split code" or "main code+plant code+split code". After the ID naming of the split lot is complete, the exclusive split lot ID is stored into the MES and/or ERP system at step 36 for administration of the lot manufacturing progress.

Figure 4:
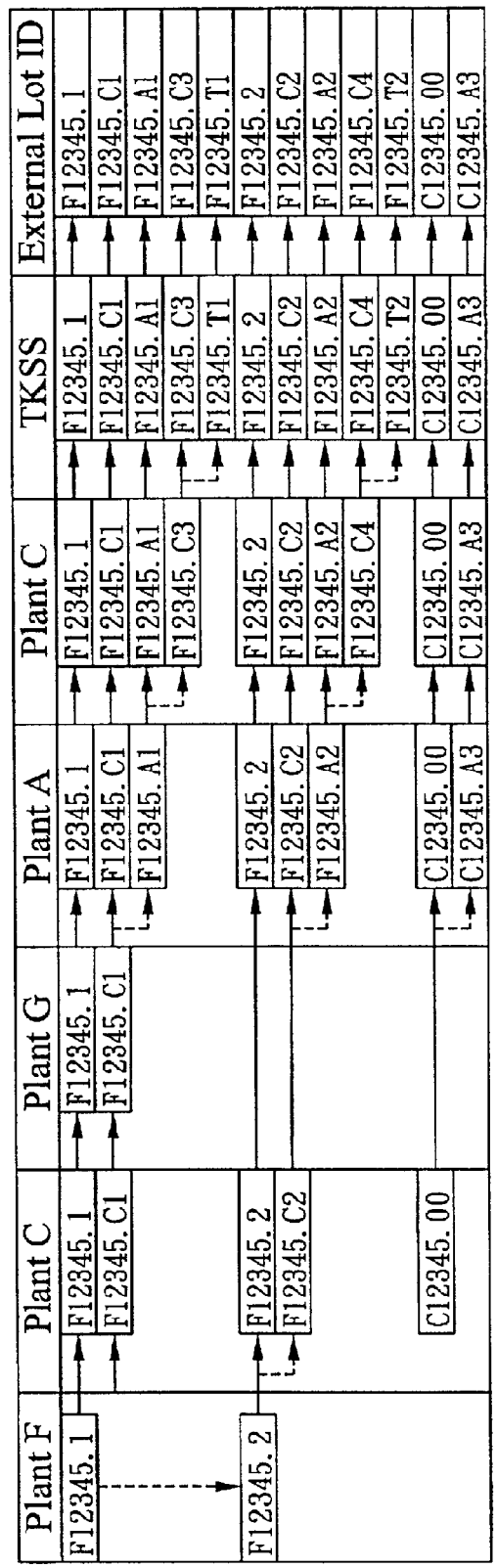
FIG. 4 is a schematic table of a split lot naming system in accordance with the preferred embodiment of the present invention.

FIG. 4 is an example table of split lot naming in accordance with the preferred embodiment. In FIG. 4, the MES of Plant F creates an ID code "F12345.0" for an initial lot. The system of naming the initial lot depends on what MES is used. The MES in Plant F is PROMIS and the lot ID generated from PROMIS uses one decimal place. However, the MES in Plant C is IBM Poseidon and the lot ID generated from IBM Poseidon uses two decimal places.

Referring still to FIG. 4, when the lot F12345.0 is divided into two lots in Plant F, the main ID unit 21 assigns each of the two lots a main code. The main code of both lots is F12345, identical to the initial lot ID but with no decimal places. The split ID unit 22 identifies that the lot has been divided inside Plant F and therefore assigns the two lots split codes ".1" and ".2" following the main code "F12345", respectively. The ID tags of the two lots, then, are F12345.1 and F12345.2 respectively. When the two lots are transferred between plants, F12345.1 and F12345.2 are the ID tags used by MES or ERP system administration.

Referring again to FIG. 4, when lot F12345.1 is transferred to Plant C and divided into two lots in Plant C, one lot remains ID F12345.1. The main ID unit 21 also assigns the other split lot a main code of "F12345". Then, the split ID unit 22 identifies that the lot is divided in Plant C and therefore assigns the split lot a plant code ".C" following the main code "F12345". The split ID unit 22 assigns the split lot a split code "1" following the plant code. The ID of the split lot is F12345.C1. When the lot is transferred to another plant, the imported plant keeps the F12345.C1 as lot ID administration.

Referring still to FIG. 4, when lot F12345.C1 is transferred to Plant A and divided into two lots in Plant A, one lot remains the lot ID F12345.C1. The main ID unit 21 also assigns the other split lot a main code as "F12345". Then, the split ID unit 22 identifies that the lot is divided in Plant A and therefore assigns the split lot a plant code ".A" following the main code "F12345". The split ID unit 22 then assigns the split lot a split code "1" following the plant code because this is the first lot of "F12345.A". The ID code of the split lot is "F12345.A1". The split codes are assigned according to the time order of split. Therefore, referring to FIG. 4, "F12345.C1" is the first split lot of "F12345" in Plant C, "F12345.C2" is the second split lot of "F12345" in Plant C and so on.

In a preferred embodiment of the present invention, the plant codes are assigned as alphabetical codes, e.g., A, B, C, etc. However, the plant codes can also be assigned as given numeric or symbolic codes according to the setting of the manufacture enterprise. With the plant codes, it is easy to identify in which plant the lot is divided. In a preferred embodiment of the present invention, the split codes are assigned as numeric codes, e.g., 1, 2, 3, etc. However, the system of assigning the split codes of the split lots can also be numeric, alphabetical, symbolic codes or combination thereof arranged in sequence, e.g., 11, 1A, A1, AZ. In a preferred embodiment of the present invention, the split ID unit 22 distinguishes the main code and the split code or plant code by assigning a separator, e.g., "." or "-" between the main code and the split code or plant code.

In a preferred embodiment of the present invention, all ID codes are stored in the ID storage unit 20. Therefore, when a lot with main code "F12345" splits in Plant C, the split ID unit 22 searches out the last lot split in Plant C from the ID storage unit 20 is F12345.C3, and the split ID unit 22 assigns the split code "4" for the lot as lot ID "F12345.C4".

The present invention has been described above in connection with examples. The invention provides substantial advantages over prior art. This invention provides a solution to avoid duplicated lot ID and assign an exclusive lot ID to every split lot. This invention also provides transparent lot traceability for lots transferred between plants. Because every lot is assigned an exclusive lot ID according to the present invention, it also improves lot ID creation fail issues due to ID having been created prior to lot transfer.

The forgoing embodiments of the present invention have been presented for purposes of illustration and description. They are not intended to be limit the invention to the precise forms disclosed, and obviously many modifications and variations can be made. Therefore, the scope of the appended claims should be accorded the broadest interpretation so as to encompass all such modifications and similar arrangements.

What is claimed is:

1. A spilt lot ID naming system for creating an exclusive ID for a split lot in a multiple-plant enterprise, wherein the split lot originates from an initial lot which begins processing at an initial plant, comprising:

a main ID unit which assigns a main code to a split lot;

a split ID unit identifying in which plant the split lot is divided and when the split lot is divided in the initial plant, assigns a split code to the split lot following the main code, or when the split lot is not divided in the initial plant, assigns a plant code and a split code to the split lot following the main code; and a lot data unit for storing the lot ID created from the main ID unit and the split ID unit.

2. The spilt lot ID naming system of claim 1, wherein the main ID unit assigns the split lot the main code which is identical to the ID of the initial lot.

3. The spilt lot ID naming system of claim 1, wherein the plant code is the given numeric code representing the plant.

4. The spilt lot ID naming system of claim 1, wherein the plant code is the given alphabetic code representing the plant.

5. The spilt lot ID naming system of claim 1, wherein the split code is assigned in numeric sequence.

6. The spilt lot ID naming system of claim 1, wherein the split code is assigned in alphabetic sequence.

7. A spilt lot ID naming method for or creating an exclusive ID for a split lot in a multiple-plant enterprise, wherein the split lot is originated from an initial lot which begins processing at an initial plant, comprising the steps:

assigning a main code to a split lot;

identifying in which plant the split lot is divided;

assigning a split code to the split lot according to a sequence when the split lot is divided in the initial plant; or assigning a plant code and a split code according to a sequence to the split lot when the split lot is not divided in the initial plant; and storing the main code, the split code and/or the plant code of the split lot for lot administration.

8. The spilt lot ID naming method of claim 7, wherein the ID of the initial lot is assigned as the main code of the split lot.

9. The spilt lot ID naming method of claim 7, wherein the plant code is the given numeric code representing the plant.

10. The spilt lot ID naming method of claim 7, wherein the plant code is the given alphabetic code representing the plant.

11. The spilt lot ID naming method of claim 7, wherein the split code is assigned in numeric sequence.

12. The spilt lot ID naming method of claim 7, wherein the split code is assigned in alphabetic sequence.

* * * * *